United States Patent Office 3,401,208
Patented Sept. 10, 1968

3,401,208
CONVERSION OF DIPHENYLALKANE TO
HIGHER VALUE PRODUCTS
Oliver C. Kerfoot and Delmar D. Krehbiel, Ponca City,
Okla., assignors to Continental Oil Company, Ponca
City, Okla., a corporation of Delaware
No Drawing. Filed June 30, 1966, Ser. No. 561,718
10 Claims. (Cl. 260—671)

ABSTRACT OF THE DISCLOSURE

Diphenylalkanes commonly produced in the alkylation of aromatics can be converted to more valuable products such as monophenylalkanes, dialkylbenzene and/or alkylated tetralins by further alkylating the diphenylalkanes with olefins or chloroparaffins in the presence of a Friedel-Crafts catalyst.

This invention relates to alkylation of diphenylalkanes. In a specific embodiment, this invention relates to upgrading diphenylalkanes to useful products by alkylation.

It is known that aromatic hydrocarbons such as benzene, toluene, xylene, cumene, naphthalene and the like can be alkylated with a monoolefin or a monohalogenated aliphatic hydrocarbon in the presence of a Friedel-Crafts catalyst such as aluminum chloride, zinc chloride, aluminum bromide, borontrifluoride, hydrogen fluoride, other acid metal halides and the like to produce an arylalkane. Unfortunately, the olefins or haloparaffins will generally contain minor amounts of diolefins or dihalogens and a small amount of diphenylalkanes are produced. For example, when benzene is alkylated with such an aliphatic compound, the major product is a phenylalkane of the type:

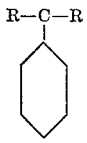

R—C—R wherein each R is an alkyl radical. In general, the aliphatic hydrocarbon or halogenated hydrocarbon will contain 8 to 16 carbon atoms, since such alkylates (alkylates being the term widely used in the trade to define the alkylated product) are especially useful as intermediates for preparation of detergents by sulfonating the alkylate. However, this invention is applicable to alkylates having 4 to 20 or more carbon atoms in the alkane portion.

Like most reactions, unfortunately, the reaction product is not pure monophenylalkane, but will contain, in addition to the desired product, unreacted aromatics, alkylation material and some diphenylalkanes such as

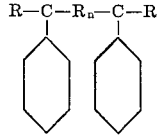

R—C—R$_n$—C—R again where each R is a saturated hydrocarbon radical and wherein $n$ is an integer from 0 to 30 or more.

The product is recovered by distillation wherein the unreacted light ends are taken overhead, the desired products are taken as intermediate cuts and a heavy bottoms which will contain the diphenylalkanes.

Although this invention is particularly applicable to such diphenylalkanes as obtained in the byproduct of benzene alkylation, it is useful for treating diphenylalkanes from any source containing at least 4 carbon atoms in the alkyl portion of the diphenylalkane.

These diphenylalkanes have only limited use as such. Therefore, it is an object of this invention to convert diphenylalkanes to products having commercial value.

According to this invention, diphenylalkanes are further alkylated with a monoolefin or a halogenated paraffin each of at least 4 carbon atoms in the presence of a Friedel-Crafts catalyst to give products of valuable properties.

The particular products will depend upon the type of catalyst and the type of alkylating material. As stated above, the alkylating material can be a monoolefin or a halogenated paraffin of at least 4 carbon atoms, but preferably will contain 8 to 14 carbon atoms, but can contain 20 or more carbon atoms. These materials are preferably straight chain, but can be branched. When the alkylating olefin or halogenated paraffin is branched, we prefer that the branch chains contain no more than 2 carbon atoms in any one such branch and more preferably that only one such branch be present although the method is operable with greater branching and branch length. We also prefer that the halogen of the halogenated paraffin be on the 2 position.

In alkylating benzene to prepare detergent intermediates, the benzene is usually alkylated with an olefin or halogenated paraffin of 8 to 16 carbon atoms, and usually a mixture of such alkylating material is used. The diphenylalkane byproduct will, in this case, be a mixture of diphenylalkanes having an average molecular weight of about 300 to about 330.

Examples of suitable diphenylalkanes which can be treated by the method of this invention include: 2,3-diphenylbutane; 2,4-diphenylpentane; 2,5-diphenylhexane; 3,5-diphenylheptane; 3,7 - diphenyl-5-methylnonane; 2,9-diphenyl - 6 - ethyldecane; 2,8-diphenyldodecane; 3,8-diphenylhexadecane; 4,10-diphenyleicosane and the like and mixtures of such compounds. In general, they will comprise a random mixture of all possible isomers.

Olefins useful in alkylating the diphenylalkanes include butene-1; pentene-3; hexene-2; 4-methyloctene-2, 4-ethyldecene-2; tetradecene-6; hexadecene-3; 4-methyl-6-ethyldodecene-2; dodecene-7; octadecene-3; eicosene-2; pentacosene-6; triacontene-2 and the like.

Halogenated paraffins useful in alkylating the diphenylalkanes include 2-chlorobutane; 2-chloro-hexane; 1-chloro-3-ethyloctane; 4 - chloro - 6 - methyldecane; 2-chlorododecane; 2-chloro - 3,4 - diethyl hexadecane; 2-chloroeicosane; 2-bromo-octane; 3-bromo-octane; 2-bromo-4-ethyl-nonane; 4-iodododecane; 2-fluorododecane and the like.

As previously indicated, the alkylation is carried out in the presence of a Friedel-Crafts type catalyst. The reaction can be carried out over a wide temperature range, e.g., below room temperature say 0° C. to refluxing temperature and from subatmospheric pressures to superatmospheric pressures. In general, a temperature will be used from 50° C. to refluxing temperature at atmospheric (normal) pressure.

As previously mentioned, the product of the reaction will be primarily dependent upon the catalyst and the alkylating material. For example, if the diphenylalkane is alkylated with a linear, or slightly branched, olefin in the presence of AlCl$_3$, as catalyst, the product generally is a mixture which upon sulfonation gives an oil soluble sulfonate useful in lubricant formulations. However, under some conditions, a large amount of monoalkylated diphenylalkane will be produced and the product can be separated as below. The same reaction carried out in the presence of HF, as the catalyst, generally gives a mixture of products which, upon fractionation, can be separated into a dialkylbenzene-rich portion suitable as oil-soluble sulfonation feedstock and into a monoalkylated diphenylalkane-rich portion which is valuable as a synthetic lubricant or which can be further treated by sulfonation which makes an excellent dispersant.

On the other hand, if the diphenylalkane is treated with a haloparaffin, e.g. chloroparaffin, in the presence of the $AlCl_3$ catalyst, the product generally is a mixture which can be separated by fractionation into an alkylated tetralin and dialkylbenzene-rich portion suitable as oil-soluble sulfonate feedstock and into a monoalkylated diphenylalkane-rich portion which can be used as a synthetic lubricant or converted by sulfonation to a sulfonate useful as a dispersant.

The tailoring of the product by selection of the catalyst and alkylating material can best be illustrated by the following examples. In all of the following examples, the diphenylalkanes were a mixture of such alkanes produced in alkylating benzene with chloroparaffins of 10 to 12 carbon atoms with $C_{12}$ predominating and the diphenylalkanes recovered as the bottoms from a fractionation column.

Example I 339 grams (1.09 mols) of diphenylalkanes of average molecular weight of about 310 were charged to a creased, 3-neck flask equipped with a stirrer, thermometer and a reflux condenser. 21.6 grams (5 wt. percent based on olefin) of anhydrous $AlCl_3$ were added in 3 portions and 433 grams (2.18 mols) of tetradecene-1 were added gradually with stirring and the reaction was allowed to reach a maximum temperature of 50° C. The product was analyzed by Mass Spectrometry with the following results:

| | Percent |
|---|---|
| Alkylated tetralins | 33.7 |
| Dialkylbenzenes | 46.2 |
| Diphenylalkanes (unreacted) | 3.5 |
| Monoalkylated diphenylalkanes | 11.0 |
| Alkylated naphthalenes | 5.6 |
| | 100.0 |

Average molecular weight of product=472.5

A portion of the reaction product (50 grams, 0.1058 mols) was charged to a 500 ml., 3-neck flask and 50 grams of dodecane added as solvent. The mixture was heated to 65° C. and 75 grams of oleum (23% free $SO_3$) was added, with vigorous stirring, over a 30-minute period in order to maintain the temperature. The stirring was continued for an additional hour at 65° C. and then allowed to settle into a spent acid layer and an upper oil layer.

The layers were separated and each analyzed for total acidity and sulfonic acidity. The oil layer contained 0.1071 equivalent of sulfonic acidity and the lower spent acid layer contained 0.0012 equivalent of sulfonic acidity which shows that about 99% of the sulfonic acid was soluble in the upper oil layer, thus showing that the reaction product of the alkylation produced an oil-soluble sulfonate feedstock.

In the following examples, the diphenylalkanes were obtained as above and had the following composition as determined by Mass Spectrometry analysis.

| | Percent | | | |
|---|---|---|---|---|
| Carbon No. | Tetralins | Alkyl-benzenes | Diphenyl-alkanes | Naphthalenes |
| 17 | 0.2 | 0.1 | | 0.1 |
| 18 | 1.6 | 1.2 | | 0.2 |
| 19 | 0.7 | 1.1 | | 0.1 |
| 20 | 0.1 | 0.2 | | |
| 21 | 0.1 | 0.2 | | |
| 22 | 0.1 | 0.2 | 16.5 | |
| 23 | 0.1 | 0.2 | 44.2 | |
| 24 | 0.1 | 0.1 | 31.8 | |
| 25 | 0.1 | 0.1 | 0.8 | |
| 26 | | 0.1 | | |
| 27 | | 0.2 | | |
| 28 | | 0.1 | | |
| Total | 3.1 | 3.8 | 92.5 | 0.4 |

Average M.W.~310.

Example II 396 grams of the above composition were added to a polyethylene reactor and cooled to 5° C. 400 grams of HF were added and then 500 grams of tetradecene-1 were added over a period of 1.5 hours while being stirred and the material was stirred for an additional 2 hours. The temperature rose slowly over this period to room temperature. The product showed the following composition as determined by Mass Spectrometry.

| | Percent |
|---|---|
| Alkylated tetralins | 0.9 |
| Dialkylbenzenes | 40.5 |
| Diphenylalkanes ($C_{28-34}$) | 16.7 |
| Monoalkylated diphenylalkanes ($C_{35-39}$) | 32.8 |
| Alkylated naphthalenes | 9.1 |
| | 100.0 |

Example III 100 grams of the diphenylalkanes as above, 638 grams of $C_{12-14}$ chloroparaffins (20 mol percent) and 7.15 grams of anhydrous $AlCl_3$ were used in this run. This represents a 2:1 mol ratio of chloroparaffins to diphenylalkanes. The catalyst was added to the DPA (diphenylalkanes) and the material heated to 65° C. The chloroparaffins were then added over a period of one hour while the mixture was being vigorously stirred. The reaction mixture was post stirred for 30 minutes. A sludge was formed which was separated from the liquid phase. This sludge weighed 30.2 grams. The organic layer was distilled and separated into a light overhead fraction and a heavy bottoms fraction. No benzene or monoalkylate was detected in the lighter fraction, which was recovered paraffins. The bottoms weighed 181.6 grams and showed the following composition based on Mass Spectrometry.

| Component | Percent | Lb./lb. DPA | Mol/mol DPA |
|---|---|---|---|
| Alkylated tetralins | 26.7 | 0.48 | 0.34 |
| Dialkylbenzenes | 33.3 | 0.61 | 0.42 |
| Diphenylalkanes ($C_{22-28}$) | 7.2 | 0.13 | 0.12 |
| Monoalkylated diphenylalkanes ($C_{29-38}$) | 25.7 | 0.47 | 0.16 |
| Alkylated naphthalenes | 7.1 | 0.13 | 0.09 |

Example IV

In this run, 100 grams of the diphenylalkane as used in Examples II and III, 319 grams of chloroparaffin (20 mol percent as in Example III) and 3.1 grams of anhydrous $AlCl_3$ were used. This represents a 1:1 mol ratio of chloroparaffins to the diphenylalkanes. In this run, the DPA and chloroparaffins were charged to the reaction vessel and the $AlCl_3$ was slowly added with vigorous stirring over a period of 15 minutes at 40° C. The reaction was held to 50° C. for one-half hour and then at 60° C. for 45 minutes while being stirred subsequent to the addition of the final portion of $AlCl_3$. The resulting sludge weighed 14 grams, and the organic product was recovered and distilled. The overhead contained no benzene or monoalkylate. The bottoms (130.2 grams) was analyzed and showed the following composition:

| Component | Percent | Lb./lb. DPA | Mol/mol DPA |
|---|---|---|---|
| Alkylated tetralins | 20.0 | 0.27 | 0.19 |
| Dialkylbenzenes | 20.4 | 0.27 | 0.20 |
| Diphenylalkanes ($C_{22-27}$) | 26.3 | 0.34 | 0.33 |
| Monoalkylated diphenylalkanes ($C_{29-38}$) | 28.5 | 0.37 | 0.23 |
| Alkylated naphthalenes | 3.5 | 0.05 | 0.03 |

From the above examples, it can be seen that the diphenylalkanes can be converted to useful products by alkylating them with an olefin or chloroparaffin in the presence of a Friedel-Crafts catalyst.

Having described the invention, we claim:
1. A method of converting a hydrocarbon fraction containing a major amount of diphenylalkanes containing at least 4 carbon atoms in the alkane portion to useful products which comprises contacting said diphenylalkanes with an alkylating agent selected from the group consisting of an aliphatic olefin of at least 4 carbon atoms and an aliphatic chloroparaffin of at least 4 carbon atoms in the presence of a Friedel-Crafts catalyst.

2. The method of claim 1 wherein the diphenylalkane contains at least 8 carbon atoms in the alkane portion of the compound and the alkylating agent contains at least 8 carbon atoms and contains not more than 2 carbon atoms in any branch chain.

3. The method of claim 1 wherein the diphenylalkane is a mixture of diphenylalkanes wherein the alkane portion of the diphenylalkanes contains 8 to 16 carbon atoms, and the alkylating agent contains 8 to 16 carbon atoms.

4. The method of claim 3 wherein the reaction is carried out at a temperature in the range of 0° C. to the refluxing temperature of the reactants.

5. The method of claim 4 wherein the alkylating agent is an olefin.

6. The method of claim 5 wherein the catalyst is hydrogen fluoride.

7. The method of claim 5 wherein the catalyst is anhydrous aluminum trichloride.

8. The method of claim 4 wherein the alkylating agent is a chloroparaffin.

9. The method of claim 8 wherein the catalyst is hydrogen fluoride.

10. The method of claim 8 wherein the catalyst is anhydrous aluminum trichloride.

References Cited

UNITED STATES PATENTS

| | | | |
|---|---|---|---|
| 3,274,278 | 9/1966 | Kapur et al. | 260—671 |
| 3,272,881 | 9/1966 | Kapur et al. | 260—671 |

DELBERT E. GANTZ, *Primary Examiner.*

C. R. DAVIS, *Assistant Examiner.*